US 7,453,876 B2

(12) United States Patent
Hua et al.

(10) Patent No.: US 7,453,876 B2
(45) Date of Patent: Nov. 18, 2008

(54) METHOD AND APPARATUS FOR PROVIDING DISTRIBUTED SLF ROUTING CAPABILITY IN AN INTERNET MULTIMEDIA SUBSYSTEM (IMS) NETWORK

(75) Inventors: Shiyan Hua, Lisle, IL (US); Ahmed N. Zaki, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 581 days.

(21) Appl. No.: 10/956,858

(22) Filed: Sep. 30, 2004

(65) Prior Publication Data

US 2006/0067338 A1 Mar. 30, 2006

(51) Int. Cl.
*H04L 12/28* (2006.01)
(52) U.S. Cl. .................... 370/392; 370/400; 455/435.1
(58) Field of Classification Search .................. None
See application file for complete search history.

(56) References Cited

U.S. PATENT DOCUMENTS

| 2002/0147845 | A1 | 10/2002 | Sanchez-Herrero et al. | |
|---|---|---|---|---|
| 2004/0121760 | A1* | 6/2004 | Westman et al. | 455/411 |
| 2004/0234060 | A1* | 11/2004 | Tammi et al. | 379/204.01 |
| 2004/0243711 | A1* | 12/2004 | Rajaniemi | 709/227 |
| 2005/0009520 | A1* | 1/2005 | Herrero et al. | 455/435.1 |
| 2005/0111641 | A1* | 5/2005 | Koskinen et al. | 379/114.2 |
| 2006/0195565 | A1* | 8/2006 | De-Poorter | 709/224 |

OTHER PUBLICATIONS

3GPP SA VG2: Digital Cellular Telecommunications System (Phase 2+); Universal Mobile Telecommunications System (UMTS); IP Multimedia Subsystem (IMS); Stage 2; (3GPP TS 23.228 version 5.12.0 Release 5), ETSI TS 123 228; ETSI Standards, European Telecommunications Standards Institute, Sophia-Antipo, FR, Vo. 30SA2, No. V5120, Mar. 2004, pp. 1-174; XP014016500.
Mouly et al: "The GSM System for Mobile Communications—7.1 Location Management" GSM System for Mobile Communications. Comprehensive overview of the European Digital Cellular Systems, AS.L.U: Cell & Sys, 1992, pp. 432-498; XP002129579.
Digital Cellular Telecommunications System (Phase 2+); Universal Mobile Telecommunications System (UMTS); IP Multimedia (IM) Subsystem Cx and Dx Interfaces: Signaling flows and message contents (3GPP TS 29.228 version 5.7.0 Release 5); ETSI TS 129 228; ETSI Standards, European Telecommunications Standards Institute, Sophia-Antipo, FR, vol. 30CN4, No. V570, Mar. 2004, pp. 1-50; XP014017385.
Garcia-martin M. et al.; "Diameter Session Initiatioin Protocol (SIP) Application"; IETF Standard-Working-Draft, Internet Engineering Task Force, IETF, CH, vol. aaa, No. 3, Jul. 8, 2004; XP0150015024.
European Search Report.

* cited by examiner

*Primary Examiner*—Edan Orgad
*Assistant Examiner*—Jung Park

(57) ABSTRACT

A routing technique for supporting an internet protocol (IP) Multimedia Subsystem (IMS) Subscriber Locator Function (SLF) is provided. It is, in part, based on using a user's identification information, e.g. a user's realm, to facilitate the routing of information. This technique enables the implementation of a distributed subscriber location function (SLF) in an IMS network. The subscriber locator function (SLF) ultimately allows for accommodation of more users through multiple home subscriber service (HSS) elements.

20 Claims, 4 Drawing Sheets

METHOD AND APPARATUS FOR PROVIDING DISTRIBUTED SLF ROUTING CAPABILITY IN AN INTERNET MULTIMEDIA SUBSYSTEM (IMS) NETWORK

BACKGROUND OF THE INVENTION

This invention relates to a method and apparatus for providing message routing capability in Internet Multimedia Subsystem (IMS) networks. In this regard, a routing technique for supporting a distributed Subscriber Locator Function (SLF) in such an Internet (or IP) Multimedia Subsystem (IMS) network is provided. The technique is, in part, based on using a user's identification information, e.g. a user's realm, to facilitate the routing of information. The subscriber locator function (SLF) ultimately allows for accommodation of more users through multiple home subscriber service (HSS) elements.

By way of background, for circuit switched networks, messages are typically routed by network elements such as signal transfer points (STP) using Signaling System no. 7 (SS7). However, for internet multimedia subsystem (IMS) messages, a different protocol is used. In this regard, a Diameter Base Protocol, which is an IP based protocol, is used.

The Diameter Base Protocol can be extended to support various interfaces. For example, a Cx interface is used to transfer users data between a call service control function (CSCF) element and a home subscriber server (HSS) element. An Sh interface is used to transfer subscribers data between an application server (AS) and a home subscriber service (HSS) element. In this regard, the Diameter Base Protocol has the routing capability to route the Cx/Sh Diameter message to the appropriate network elements. This includes relay, redirect and proxy capability.

The messages of the Diameter Base Protocol extensions (Cx and Sh) allows for public and private identification information of a user (e.g. a public user identification (PUID) and a private user identification (PRID)). Those IDs can include not only digits but other non-digit characters. For example, a private user identification for user x1 may take the form of x1@xxx.lucent.com. In this case, the private user identification has the realm of xxx.lucent.com. Public user identification is information that relates to the same user (e.g., x1) but is simply in another form (or forms) that is used by others to address this user. A single user may have multiple public user identifications associated with its private user identification. For example, the public user identification may be x1@lucent.com or x1@bell-labs.com. In this way, the general public may never be aware of the private user identification of a user, only the public user identification(s). The private user identification information may only be known to the network and the service provider.

Of course, similar situations occur when the user identification information is simply numeric digits, as in the case of phone numbers. So, a public user identification for a user may be a mobile phone number that is published, while a private user identification for the same user may be the mobile identification number (MIN) for the user's mobile phone.

Recent standards (e.g., 3GPP TS 29.228 'Cx and Dx interfaces based on the Diameter Protocol' and 3GPP TS 23.228 'IP Multimedia Subsystem (IMS)') set forth to govern implementation of IMS networks indicate that a subscriber locator function (SLF) could be used by the IMS networks. However, the subscriber locator function is not defined in the standard, nor is any implementation known. Absent a useful solution, routing within an IMS system having a subscriber locator function may be difficult.

The present invention contemplates a new and improved system that resolves the above-referenced difficulties and others.

SUMMARY OF THE INVENTION

A method and apparatus for providing routing capability in an internet multimedia subsystem (IMS) are provided.

In one aspect of the invention, the method comprises determining by a first network element whether a private user identification including a realm name is available for use in routing of the Diameter message, populating by the first network element a destination-realm attribute value pair of a first Diameter Protocol message with the private user identification if the private user identification is available, performing by the first network element a first subscriber location function to determine a first home subscriber service (HSS) element to which to send the first Diameter Protocol message based on the attribute value pair, transmitting the first Diameter Protocol message from the first network element to the first home subscriber service (HSS) element, populating by the first network element the destination-realm attribute value pair of a second Diameter Protocol message with a whole network realm if the private user identification is not available, transmitting the second Diameter Protocol message from the first network element to a second network element, performing a second subscriber location function by the second network element to determine a second home subscriber service (HSS) element to which the second Diameter Protocol message should be sent, populating by the second network element a Redirect-Host attribute value pair with information relating to the second home subscriber service (HSS) element, and transmitting the second message back to the first network element and to the second home subscriber service (HSS) element if the second home subscriber service (HSS) element is not the second network element.

In another aspect of the invention, the method comprises receiving a response to one of the first and second Diameter Protocol messages by the first network element.

In another aspect of the invention, wherein the determining whether a private user identification is available is responsive to a service request message.

In another aspect of the invention, the first network element is a call service control function (CSCF) module.

In another aspect of the invention, the first network element is an application server.

In another aspect of the invention, the second network element is the second home subscriber service (HSS) element and the method further comprises responding to the second Diameter Protocol message by the second network element.

In another aspect of the invention, performing the second subscriber location function comprises accessing at least one of a realm routing table and a peer table.

In another aspect of the invention, means are provided to perform the methods according to the invention.

In another aspect of the invention, a system comprises a first network element operative to determine whether a private user identification including realm name is available for use in routing a Diameter Protocol message, performing subscriber location function to determine a first home subscriber service (HSS) element to which to send the first Diameter Protocol message based on the availability of the private user identification, transmit the first Diameter Protocol message to the first home subscriber service (HSS) element, and transmit a second Diameter Protocol message if the private user identification is not available, a second network element operative to receive the second protocol message, perform a second subscriber location function to determine a second home subscriber service (HSS) element to which a second message should be sent and transmit the second message back to the first network element if the second home subscriber service (HSS) element is not the second network element.

In another aspect of the invention, the system further comprises tables stored in the second network element, the tables having stored therein peer information and realm routing information.

In another aspect of the invention, the first network element is responsive to a service request message.

In another aspect of the invention, the first network element is a call service control function (CSCF) module.

In another aspect of the invention, the first network element is an application server.

In another aspect of the invention, the second network element is a home subscriber service (HSS) element.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
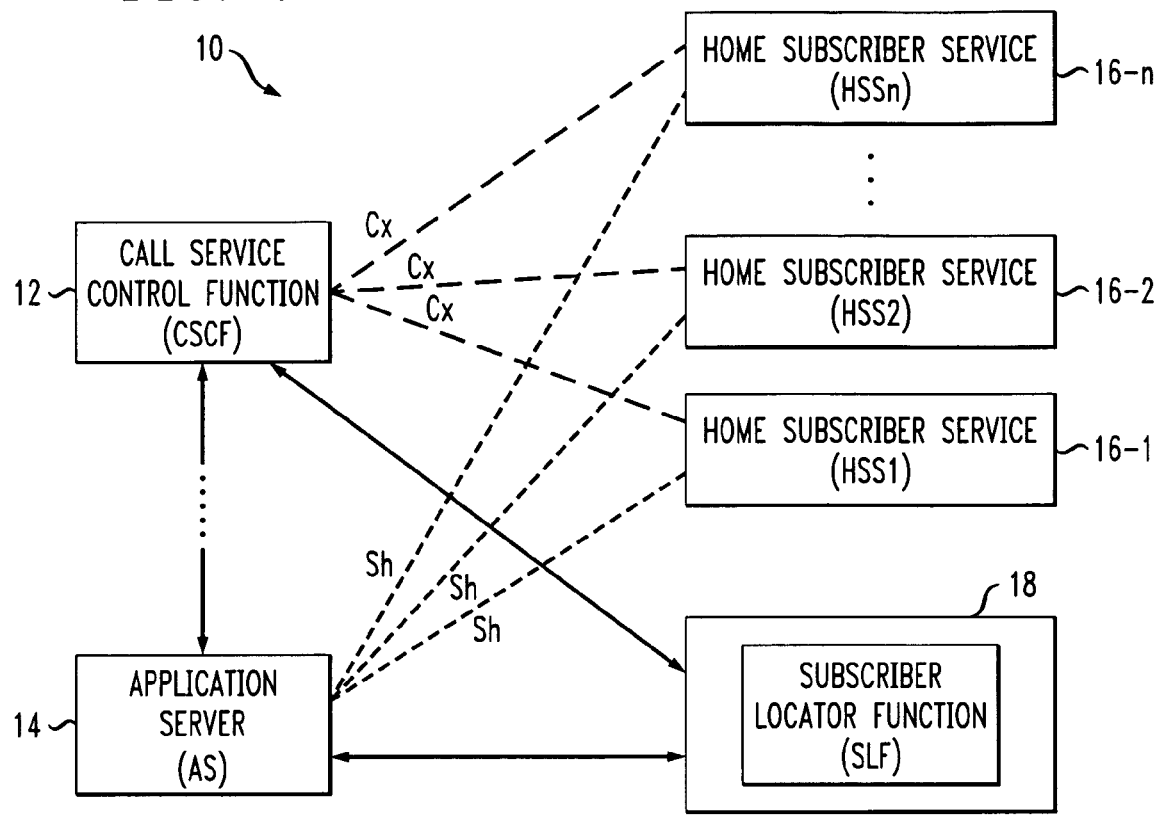
FIG. 1 illustrates a network into which embodiment from the present invention may be implemented.

Referring now to the drawings wherein the showings are for purposes of illustrating exemplary embodiments of the invention only and not for purposes of limiting same, FIG. 1 provides a view of a system into which the present invention may be incorporated. As shown, an internet (or IP) multimedia subsystem (IMS) network 10 includes a variety of network elements that communicate with one another. For example, the exemplary network 10 includes a call service control function (CSCF) module 12 and an application server (AS) 14. These network elements communicate with a plurality of home subscriber service (HSS) elements 16-1 through 16-n (also designated as HSS1, HSS2, . . . HSSn). In addition, the call service control function (CSCF) module 12 and the application server 14 communicate with a subscriber locator function (SLF) module 18. The call service control function (CSCF) module 12 and the application server 14 also may communicate with one another, usually indirectly, through other network elements (not shown). These other network elements may be employed for purposes of providing services to the network or performing other network functions.

The network elements shown use the Diameter Protocol and, thus, communicate through specified interfaces. For example, the call service control function (CSCF) module 12 communicates with the home subscriber service (HSS) modules 16-1 through 16-n over a Cx interface using Cx messages. Likewise, the application server (AS) 14 communicates with the home subscriber service (HSS) modules 16-1 through 16-n via an Sh interface using Sh messages. The Cx messages and Sh messages include a data field therein relating to a destination realm, i.e. a destination-realm attribute value pair (AVP). These messages also include a data field for a Redirect-Host attribute value pair.

It should be understood that the IMS network 10 is associated with a set of realms/domains. Each user of the IMS network 10 has a private user identification (ID) associated with the realm/domain. Of course, a user may also have more than one public user identification. As noted, there is more than one home subscriber service (HSS) element included within the IMS network, each of which may correspond to a different realm.

As detailed above, a private user ID for user x1 may take the form of x1@xxx.lucent.com. In this case, the private user identification has the realm of xxx.lucent.com.

Those of ordinary skill in the art will appreciate that the network elements shown in FIG. 1 are exemplary in nature and do not necessarily constitute the entire network into which the present invention may be incorporated. In addition, each network element may take a variety of forms in its implementation in a multimedia environment. The call service control function (CSCF) module 12, the application server (AS) 14 and home subscriber service (HSS) modules 16-1 through 16-n take forms that are well known in the field and are simply modified according to the teachings of the present invention to implement the present invention.

For example, as will be set forth in detail in the call flow diagrams of FIGS. 2-5, the call service control function module (CSCF) 12 and the application server (AS) 14 are network elements that, according to the described embodiments of the present invention, are operative to determine whether a private user identification including a realm name is available for use in routing using a Diameter Protocol and populate a destination realm attribute value pair (AVP) of a first Diameter Protocol message with the private user identification if the private user identification is available. This network element is also operative to then perform a first subscriber locator function (SLF) to determine a first home subscriber service (HSS) element to which to send the first Diameter Protocol message based on the contents of the destination-realm AVP and transmit the first Diameter Protocol message to the first home subscriber service (HSS) element. The network element is also functional to populate the destination realm attribute value pair of a second Diameter Protocol message with a whole network realm if the private user identification is not available and transmit the second Diameter Protocol message to a second network element, e.g. the subscriber locator function module (SLF) 18.

The subscriber locator function (SLF) module 18 may take the form of another home subscriber service (HSS) module, such as a super distributed home subscriber register (SDHLR). Of course, this super distributed home subscriber register (SDHLR) is preferably based upon an application environment server (AHE) and supports both Diameter Protocol and the subscriber location register functions that are well known in the art. So, the element 18 may perform functions other than those functions relating to subscriber location. Reference is made to this element as a subscriber locator function (SLF) module for ease of explanation. In addition, the subscriber locator function (SLF) module 18 preferably includes a series of look up tables having stored therein peer information and realm routing information, as will be more particularly described below in connection with FIG. 6. These tables are accessed in at least one embodiment of the invention for the purpose of determining the home subscriber service (HSS) element to which messages are to be sent.

In any case, the subscriber locator function (SLF) module 18 is a network element (e.g., a second network element) that is operative, according to described embodiments of the invention, to perform a second subscriber locator function (SLF) to determine a home subscriber (HSS) element to which the second Diameter Protocol message should be sent. It then populates a Redirect-Host attribute value pair (AVP) with information relating to the determined home subscriber service (HSS) element, and transmits the second Diameter Protocol message back to the first network element, if the determined home subscriber service (HSS) element is not the network element in which the subscriber locator function (SLF) is housed. Of note, if the determined home subscriber service (HSS) element is the second network element (i.e., the network element housing the subscriber locator function (SLF) module), then the second Diameter Protocol message is simply processed as Would a normal home subscriber service (HSS) element because it has all the information it needs to do so at this point. For example, it may provide an answer to the message as does the HSS1 in FIG. 2. There is no need in these circumstances to send the information on the determined home subscriber service (HSS) element back to the call service control function (CSCF) module or the application server (AS).

In this configuration and division of responsibility within the network, the subscriber locator function (SLF) capability is distributed. If a call service control function (CSCF) or the application server (AS) knows the user's private user identification, the subscriber locator function (SLF) is performed by the call service control function (CSCF) module or the application server (AS), respectively. If the call service control function (CSCF) or the application server (AS) does not know a user's private user identification, then the subscriber locator function (SLF) is performed by the subscriber locator function (SLF) module 18.

It should be understood that the call flows associated with the exemplary network 10 may vary depending on the components that are included within the network and are enacted to implement the service being provided. For example, certain functions will be initiated by the call service control function (CSCF) module 12 while others may be implemented by the application server (AF) 14. A difference lies in the fact that the call service control function (CSCF) module 12 will typically implement the features of the present invention in response to a service request message. The application server (AS) 14 may initiate the contemplated techniques as a result of providing services to the network.

It should also be understood that the methods according to the presently described embodiments are implemented in the network through suitable software routines that, depending on the function being performed, may trigger corresponding hardware. These software routines may be housed within a single network element such as a call service control function (CSCF) module or an application server or may be appropriately distributed throughout the network. Applicable standards may also dictate selected aspects of the implementation.

Figure 2:
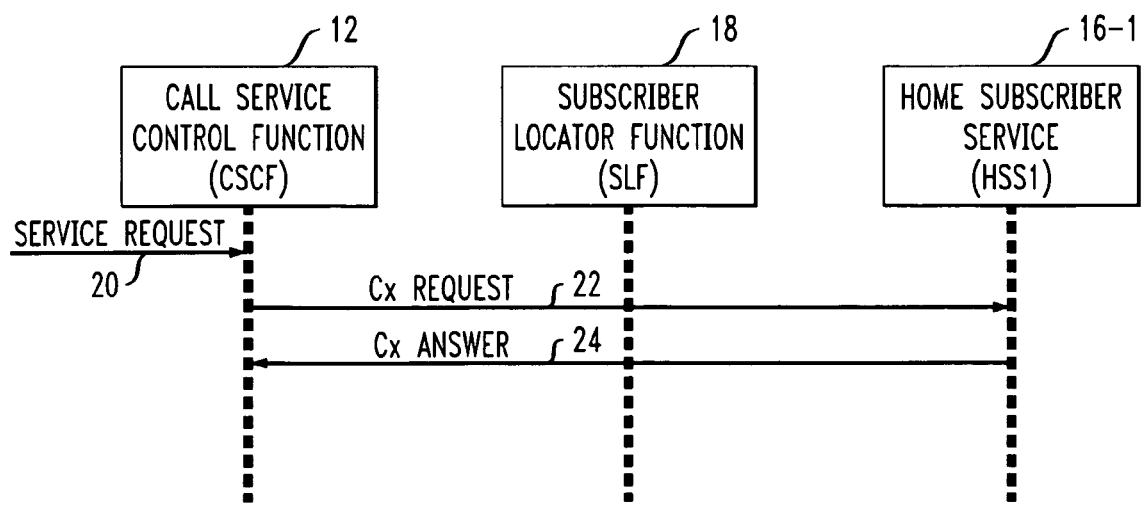
FIG. 2 is a call flow diagram illustrating an aspect of the present invention.
Figure 3:
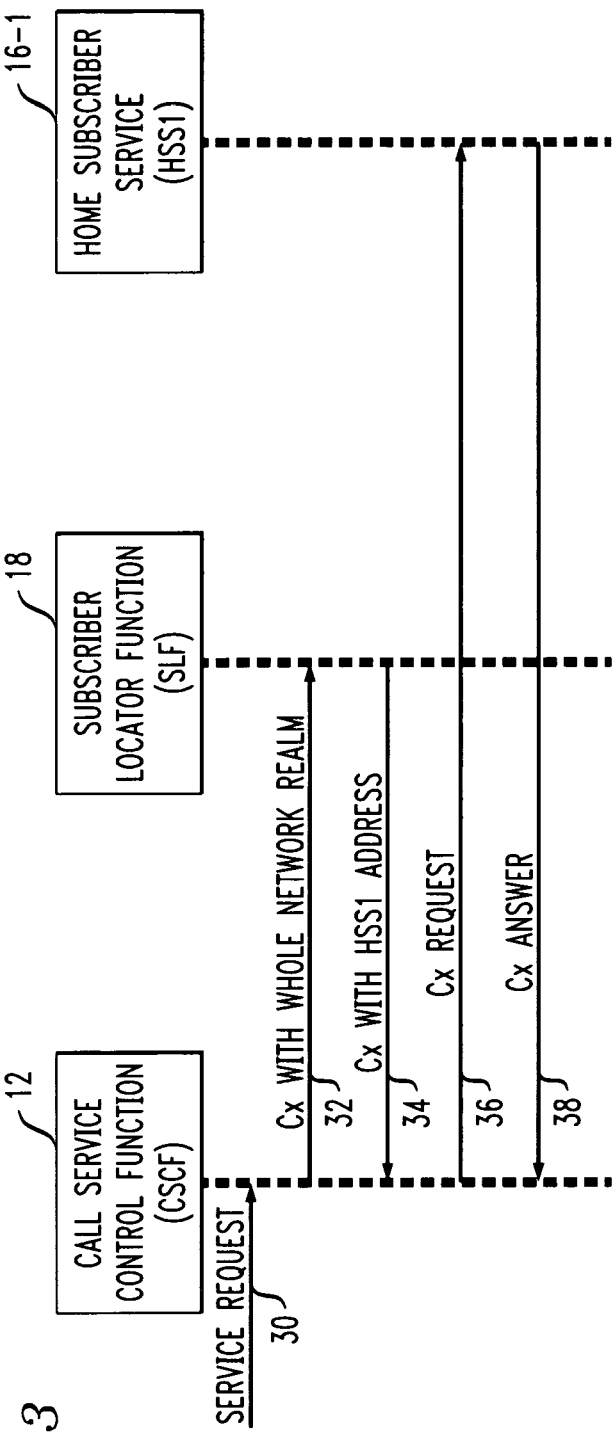
FIG. 3 is a call flow diagram illustrating an aspect of the present invention.

With respect to example call flows relating to the call service control function (CSCF) module 12, reference is now made to FIGS. 2 and 3.

Referring first to FIG. 2, the techniques of the present invention are initiated upon receipt by the call service control function (CSCF) module 12 of a service request message (at 20). If the call service control function (CSCF) module 12 is able to determine the private user identification of the subscriber (e.g. the IMS user), the call service control function (CSCF) will populate the noted Destination—Realm AVP of the Cx request message with the private user identification realm, e.g. x1@xxx.slucent.com. This is a part of the distributed subscriber locator (SLF) capability of the present invention.

The call service control function (CSCF) module will then send the Cx message to a corresponding HSS host, e.g. home subscriber service (HSS) element 16-1, based on the routing table stored in the call service control function (CSCF) module (at 22). This routing table(s) may take a variety of forms which correlate realms (or private user identifications) with home subscriber service (HSS) elements. In normal processing, the home subscriber service (HSS) element 16-1 will answer the request with a Cx answer (at 24).

With reference now to FIG. 3, the techniques of the present invention are likewise initiated upon receipt by the call service control function (CSCF) module 12 of a service request message (at 30). If the call service control function (CSCF) module determines that the private user identification information for the user is not available, the call service control function (CSCF) module will populate the mandatory Destination-Realm attribute value pair (AVP) of the Cx request message with the realm of the whole IMS network. An example of a form of a whole IMS network realm would be "network.com." The call service control function (CSCF) module will then send the Cx message to another network element (e.g., a second network element) such as the subscriber locator function (SLF) module located in, for example, an SDHLR host address or other home subscriber service (HSS) element, based on routing table stored in the call service control function (CSCF) module (at 32).

According to the data stored in the Destination-Realm attribute value pair (AVP) and the Public User ID (PUID), the subscriber locator function (SLF) module searches mapping tables that maps a PUID to a network realm. As noted above, the Destination-Realm attribute value pair (AVP) is provided in the Cx message sent to the subscriber locator function (SLF) module. It should also be understood that the Public User ID (PUID) is also provided in the Cx message. Based on the search result of realm routing table (and possibly other tables), the subscriber locator function (SLF) module determines to which home subscriber service (HSS) module (e.g. home subscriber service (HSS) module 16-1) the Cx message should be sent, and replies to the call service control function (CSCF) request with a Cx message (at 34). The Cx message includes the address/name of the determined home subscriber service (HSS) module (e.g. home subscriber service (HSS) module 16-1). To do so, a Redirect-Host attribute value pair (AVP) is populated with the noted information. This step/function corresponds to another part of the distributed subscriber locator function (SLF) according to the present invention.

The call service control function (CSCF) module then sends the request to the home subscriber service (HSS) module (e.g. home subscriber service (HSS) module 16-1) as indicated (at 36). In normal processing, the home subscriber service (HSS) (e.g. home subscriber service (HSS) module 16-1) module sends an appropriate Cx answer in response (at 38).

Notably, the tables used to identify the public user identifications (PUID) and network realm mapping table in the subscriber locator function (SLF) module of, for example, the SDHLR do not need to store information on the public user identifications corresponding to the subscriber locator function (SLF) module (i.e. the home subscriber service (HSS) module that may house the SLF module). If a PUID cannot be found in the PUID and network realm mapping table in, for example, the SDHLR, the message will simply be processed by the home subscriber service (HSS) module that may house the SLF module.

Figure 4:
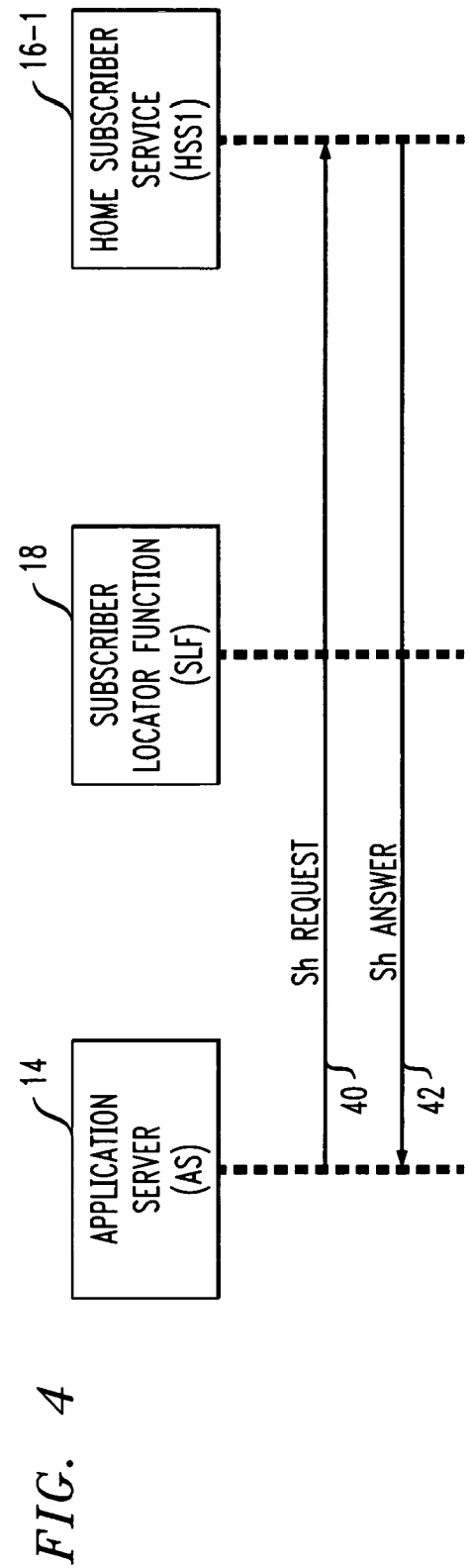
FIG. 4 is a call flow diagram illustrating an aspect of the present invention.

Referring now to FIG. 4, the techniques of the present invention may also be initiated by an application server. If the application server is able to determine the private user identification of the subscriber (e.g. the IMS user), the application server will populate the noted Destination—Realm AVP of the Sh request message with the private user identification realm, e.g. x1@xxx.lucent.com. This is a part of the distributed subscriber locator (SLF) capability of the present invention.

The application server will then send the Sh message to a corresponding HSS host, e.g. home subscriber service (HSS) element 16-1, based on the routing table stored in the application server (at 40). In normal processing, the home subscriber service (HSS) element 16-1 will answer the request with an Sh answer (at 42).

Figure 5:
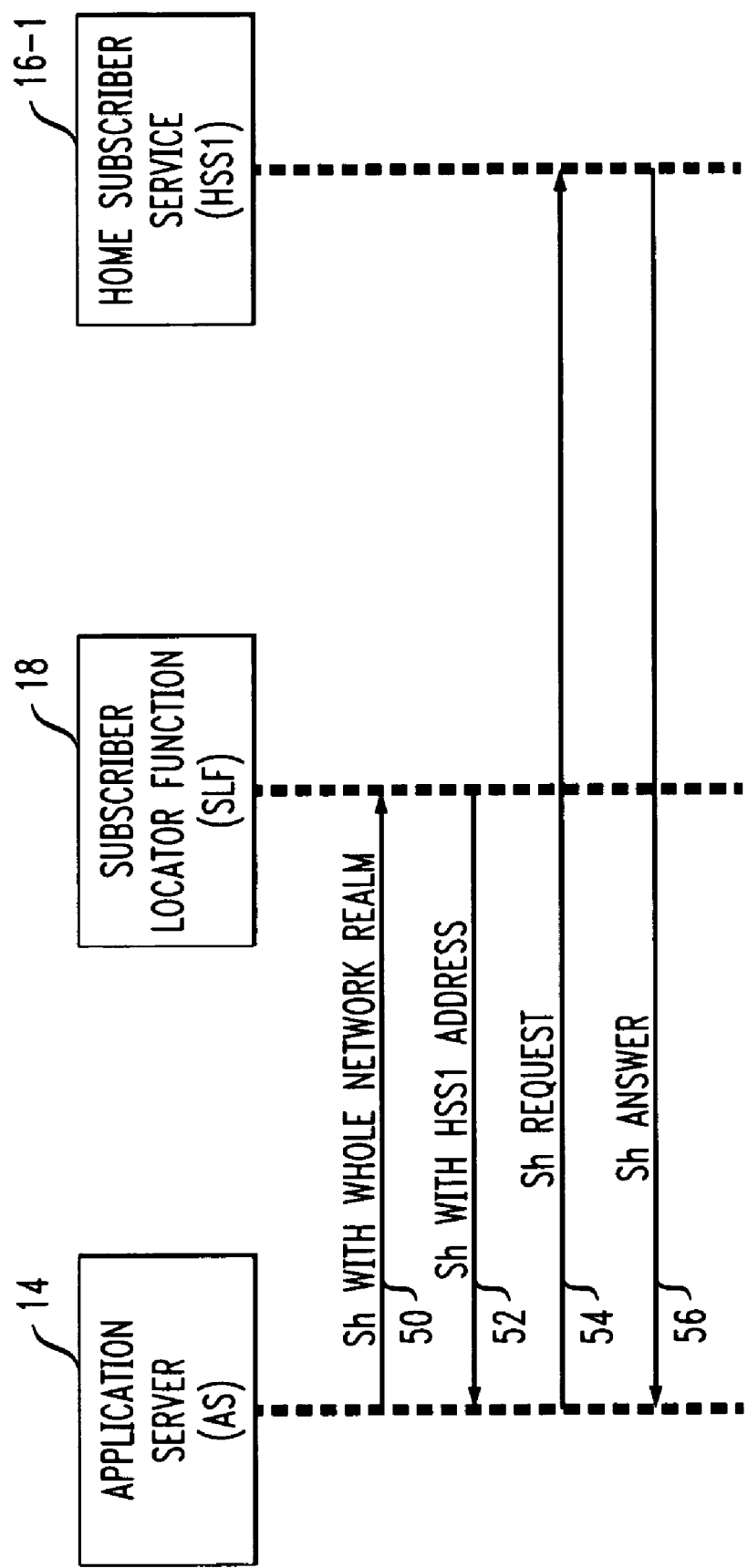
FIG. 5 is a call flow diagram illustrating an aspect of the present invention; and, FIG. 6 is a block diagram illustrating a network element according to the present invention.

With reference now to FIG. 5, if the application server determines that the private user identification information for the user is not available, the application server will populate the mandatory Destination-Realm attribute value pair (AVP) of the Sh request message with the realm of the whole IMS network. Again, the realm of the whole IMS network may take the form of "network.com." The application server will then send the Sh message to another network element such as the subscriber locator function (SLF) module located in, for example, an SDHLR host address, based on routing table stored in the application server (at 50).

According to the data stored in the Destination-Realm attribute value pair (AVP) and the Public User ID (PUID), the subscriber locator function (SLF) module searches mapping tables that maps a PUID to a network realm. As noted, the Destination-Realm attribute value pair (AVP) is provided in the Sh message sent to the subscriber locator function (SLF). It should also be understood that the Public User ID is also provided in the Sh message. Based on the search result of realm routing table (and possibly other tables), the subscriber locator function (SLF) module determines to which home subscriber service (HSS) module (e.g. home subscriber service (HSS) module 16-1) the Sh message should be sent, and replies to the application server request with an Sh message (at 34). The Sh message includes the address/name of the determined home subscriber service (HSS) module (e.g. home subscriber service (HSS) module 16-1). To do so, a Redirect-Host attribute value pair (AVP) is populated with the noted information. This step/function corresponds to another part of the distributed subscriber locator function (SLF) according to the present invention.

The application server then sends the request to the home subscriber service (HSS) module (e.g. home subscriber service (HSS) module 16-1) as indicated (at 36). In normal processing, the home subscriber service (HSS) (e.g. home subscriber service (HSS) module 16-1) module sends an appropriate Sh answer in response (at 38).

Again, the tables used to identify the public user identifications (PUID) and network realm mapping table in the subscriber locator function (SLF) module of, for example, the SDHLR do not need to store information on the public user identifications corresponding to the subscriber locator function (SLF) module (i.e. the home subscriber service (HSS) module that may house the SLF module). If a PUID cannot be found in the PUID and network realm mapping table in, for example, the SDHLR, the message will simply be processed by the home subscriber service (HSS) module that may house the SLF module.

Figure 6:
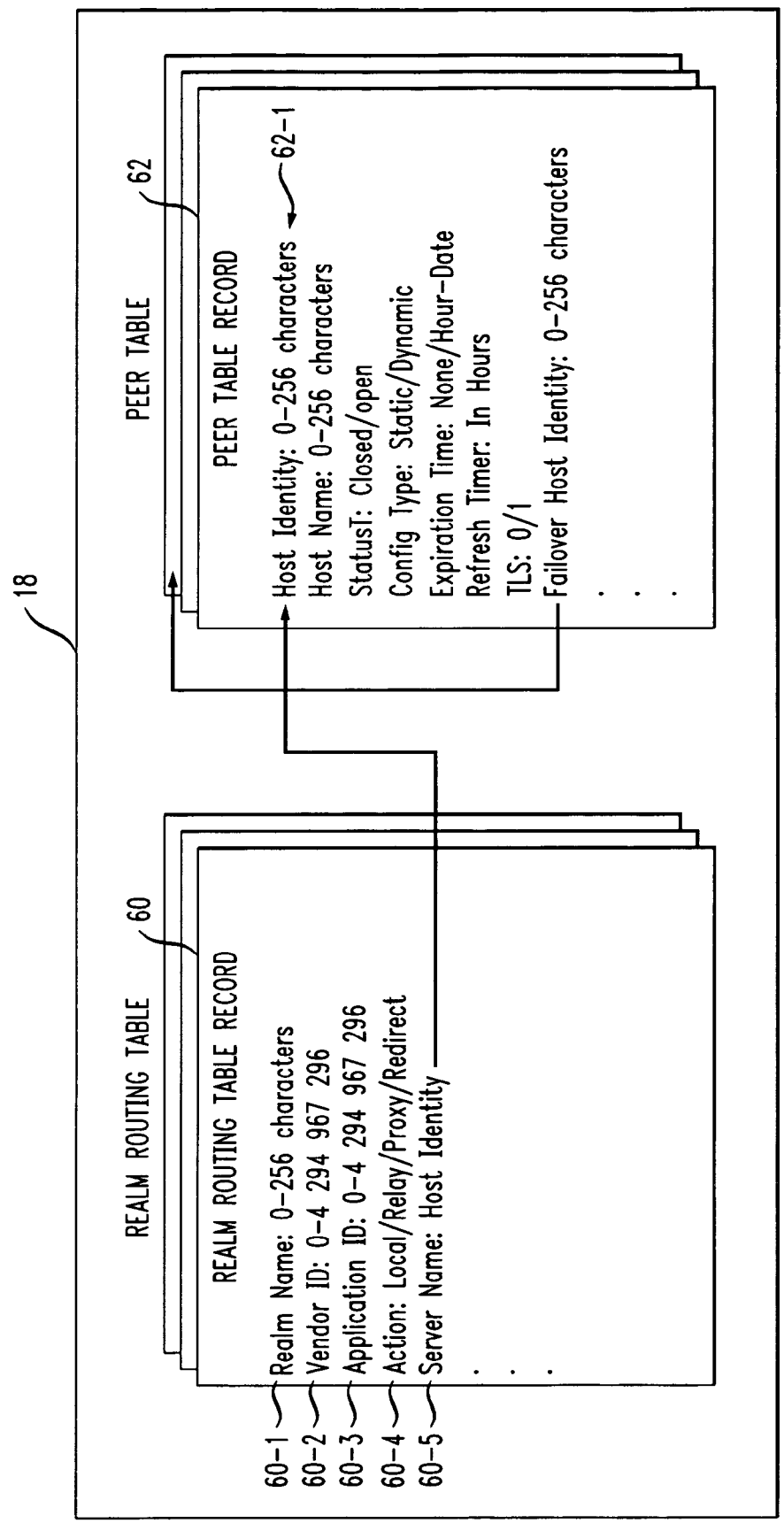

Referring now to FIG. 6, the tables (e.g., realm routing table(s) 60 and peer table(s) 62) stored in the subscriber location function module 18 are illustrated. Of course, these tables shown are merely examples of storage tables and should not be construed as limiting the invention. It should also be understood, as alluded to above, that the element 18 may have additional functionality and components that are not shown or described for ease of explanation.

In operation, if the destination realm in a message from a peer matches an entry for a Realm Name 60-1 in the realm routing table 60, and the vendor and application IDs 60-2, 60-3 in the message match those associated with the entry, the message is acted upon based on the Action field value 604, e.g., local=route to a local application, relay=route to the peer shown in the Server Name field 60-5 in the realm routing table. If a relay, for example, is needed, the Server Name 60-5 (or other related information) provides a pointer to the peer table 62, which has stored therein an address or host identity 62-1 for a network element (e.g., a home subscriber service (HSS) element) to which the message should be forwarded. If the determination is made that the entity to which the message should be sent is actually the entity housing the subscriber locator function (SLF) module, then that entity will simply perform local consumption, e.g., process the message without initiating further relay of information. As noted above, the determined entity has all the necessary information to simply process the message (and, for example, may send an answer to the appropriate entity). If no match is found, the application is notified of the event or an answer message is sent to the peer indicating that no match was found.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for routing in an internet protocol (IP) multimedia subsystem (IMS) incorporating a distributed subscriber locator function, the method comprising:

determining by a first network element whether a private user identification including a realm name is available for use in routing using a Diameter Protocol;

populating by the first network element a destination-realm attribute value pair of a first Diameter Protocol message with the private user identification if the private user identification is available;

performing a subscriber locator function by a first network element to determine a first home subscriber service (HSS) element to which to send the first Diameter Protocol message based on the destination realm attribute value pair;

transmitting the first Diameter Protocol message from the first network element to the first home subscriber service (HSS) element;

populating by the first network element the destination-realm attribute value pair of a second Diameter Protocol message with a whole network realm if the private user identification is not available;

transmitting the second Diameter Protocol message from the first network element to a second network element;

performing a second subscriber locator function by the second network element to determine a second home subscriber service (HSS) element to which the second Diameter Protocol message should be sent;

populating by the second network element a Redirect-Host attribute value pair with information relating to the second home subscriber service (HSS) element; and, transmitting the second message back to the first network element and to the second home subscriber service (HSS) element if the second home subscriber service (HSS) element is not the second network element.

2. The method as set forth in claim 1 further comprising receiving a response to one of the first and second Diameter Protocol messages by the first network element.

3. The method as set forth in claim 1 wherein the determining whether a private user identification is available is responsive to a service request message.

4. The method as set forth in claim 1 wherein the first network element is a call service control function (CSCF) module.

5. The method as set forth in claim 1 wherein the first network element is an application server.

6. The method as set forth in claim 1 wherein the second network element is the second home subscriber service (HSS) element and the method further comprises responding to the second message by the second network element.

7. The method as set forth in claim 1 wherein performing the second subscriber locator function comprises accessing at least one of a realm routing table and a peer table.

8. A system for routing in an internet multimedia subsystem (IMS) incorporating an distributed subscriber locator function, the method comprising:

means for determining by a first network element whether a private user identification including a realm name is available for use in routing using a Diameter Protocol;

means for populating by the first network element a destination-realm attribute value pair of a first Diameter Protocol message with the private user identification if the private user identification is available;

means for performing a subscriber locator function by a first network element to determine a first home subscriber service (HSS) element to which to send the first Diameter Protocol message based on the destination-realm attribute value pair;

means for transmitting the first Diameter Protocol message from the first network element to the first home subscriber service (HSS) element;

means for populating by the first network element the destination-realm attribute value pair of a second Diameter Protocol message with a whole network realm if the private user identification is not available;

means for transmitting the second Diameter Protocol message from the first network element to a second network element;

means for performing a second subscriber locator function by the second network element to determine a second home subscriber service (HSS) element to which the second Diameter Protocol message should be sent;

means for populating by the second network element a Redirect-Host attribute value pair with information relating to the second home subscriber service (HSS) element; and, means for transmitting the second message back to the first network element and to the second home subscriber service (HSS) element if the second home subscriber service (HSS) element is not the second network element.

9. The system as set forth in claim 8 further comprising means for receiving a response to one of the first and second Diameter Protocol messages by the first network element.

10. The system as set forth in claim 8 wherein the means for determining whether a private user identification is available is responsive to a service request message.

11. The system as set forth in claim 8 wherein the means for the first network element is a call service control function (CSCF) module.

12. The system as set forth in claim 8 wherein the means for the first network element is an application server.

13. The system as set forth in claim 8 wherein the means for the second network element is the second home subscriber service (HSS) element and the system further comprises means for responding to the second message.

14. The system as set forth in claim 8 wherein the means for performing the second subscriber locator function comprises accessing at least one of a realm routing table and a peer table.

15. A system for implementing an internet multimedia subsystem (IMS) incorporating a distributed subscriber locator function, the system comprising:

a first network element operative to determine whether a private user identification including a realm name is available for use in routing using a Diameter Protocol, perform a first subscriber locator function to determine a first home subscriber service (HSS) element to which to send a first Diameter Protocol message based on the availability of the private user identification, populate by the first network element a destination-realm attribute value pair of a first Diameter Protocol message with the private user identification if the private user identification is available, transmit the first Diameter Protocol message to the first home subscriber service (HSS) element, populate by the first network element the destination-realm attribute value pair of a second Diameter Protocol message with a whole network realm if the private user identification is not available, and transmit a second Diameter Protocol message to a second network element if the private user identification is not available; and, the second network element operative to perform a second subscriber locator function to determine a second home subscriber (HSS) element to which the second Diameter Protocol message should be sent and transmit the second Diameter Protocol message back to the first network element if the second home subscriber service (HSS) element is not the second network element.

16. The system as set forth in claim 15 further comprising tables stored in the second network element, the tables having stored therein peer information and realm routing information.

17. The system as set forth in claim 15 wherein the first network element is responsive to a service request message.

18. The system as set forth in claim 15 wherein the first network element is a call service control function (CSCF) module.

19. The system as set forth in claim 15 wherein the first network element is an application server.

20. The system as set forth in claim 15 wherein the second network element is a home subscriber service (HSS) element.

* * * * *